(12) United States Patent
Davis et al.

(10) Patent No.: US 9,179,588 B2
(45) Date of Patent: Nov. 10, 2015

(54) VEHICLE AND METHOD FOR WORKING TOP DRESSING MATERIAL INTO GRASS BLADES

(71) Applicant: GreensGroomer WorldWide, Inc., Indianapolis, IN (US)

(72) Inventors: Michael E. Davis, Indianapolis, IN (US); James Richard Hanson, Brownsburg, IN (US)

(73) Assignee: GreensGroomer WorldWide, Inc., Indianapolis, IN (US)

( * ) Notice: Subject to any disclaimer, the term of this patent is extended or adjusted under 35 U.S.C. 154(b) by 220 days.

(21) Appl. No.: 13/796,106

(22) Filed: Mar. 12, 2013

(65) Prior Publication Data

US 2014/0262362 A1   Sep. 18, 2014

(51) Int. Cl.
*A01B 45/00*   (2006.01)

(52) U.S. Cl.
CPC ....................................... *A01B 45/00* (2013.01)

(58) Field of Classification Search
CPC ................. A01B 45/00; Y10S 56/12
USPC .............. 172/199, 612, 684.5, 787, 685, 686; 404/96
See application file for complete search history.

(56) References Cited

U.S. PATENT DOCUMENTS

| | | | | |
|---|---|---|---|---|
| 1,002,681 A | * | 9/1911 | Hadford | 172/431 |
| 1,247,999 A | * | 11/1917 | Pascal | 172/684.5 |
| 1,484,497 A | * | 2/1924 | Hicks | 172/684.5 |
| 1,580,142 A | * | 4/1926 | Lamoreaux et al. | 172/684.5 |
| 1,663,965 A | * | 3/1928 | Aikele | 172/684.5 |
| 1,997,248 A | * | 4/1935 | Densberger | 172/688 |
| 2,142,262 A | * | 1/1939 | Beckham et al. | 404/96 |
| 2,184,913 A | * | 12/1939 | Fuller | 404/96 |
| 4,989,676 A | | 2/1991 | Rogers | |
| 5,018,587 A | | 5/1991 | Gandrud et al. | |
| 5,477,927 A | | 12/1995 | Figura | |
| 5,535,831 A | | 7/1996 | Jacobs | |
| 5,833,013 A | | 11/1998 | Davis | |
| 5,918,684 A | | 7/1999 | Tozer | |
| 6,655,469 B1 | | 12/2003 | Davis | |
| 2004/0148718 A1 | | 8/2004 | Michel | |

FOREIGN PATENT DOCUMENTS

GB    2258147    2/1993

OTHER PUBLICATIONS

International Search Report—PCT/US2014/018858—GreensGroomer WorldWide, Inc.

* cited by examiner

*Primary Examiner* — Thomas B Will
*Assistant Examiner* — Joel F. Mitchell
(74) *Attorney, Agent, or Firm* — Woodard, Emhardt, Moriarty, McNett & Henry LLP

(57) ABSTRACT

A method and vehicle for brushing top dressing material into a golf green, fairway or other supporting surface. The method and vehicle employs at least four brushes to contact each blade of grass located beneath the brush pattern of the vehicle. The brushes are arranged to contact and push the grass blades back and forth with the brushes arranged at various angles to achieve the back and forth motion to work the top dressing material down between grass blades.

13 Claims, 5 Drawing Sheets

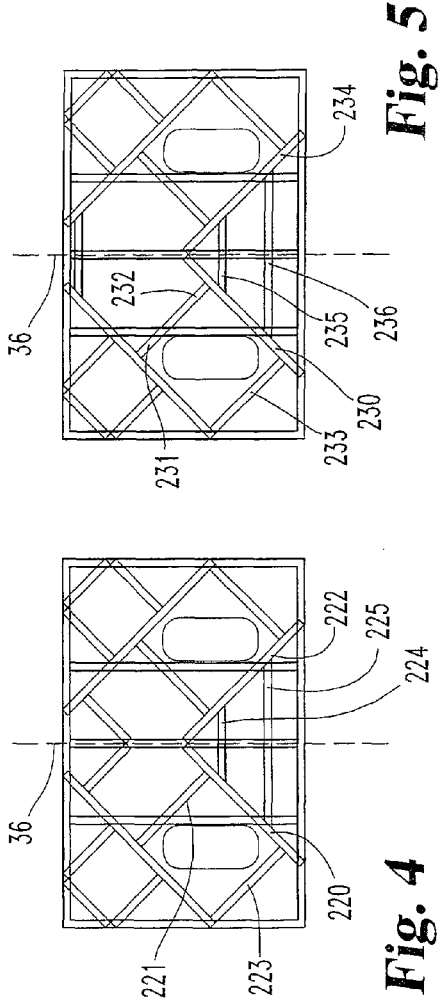
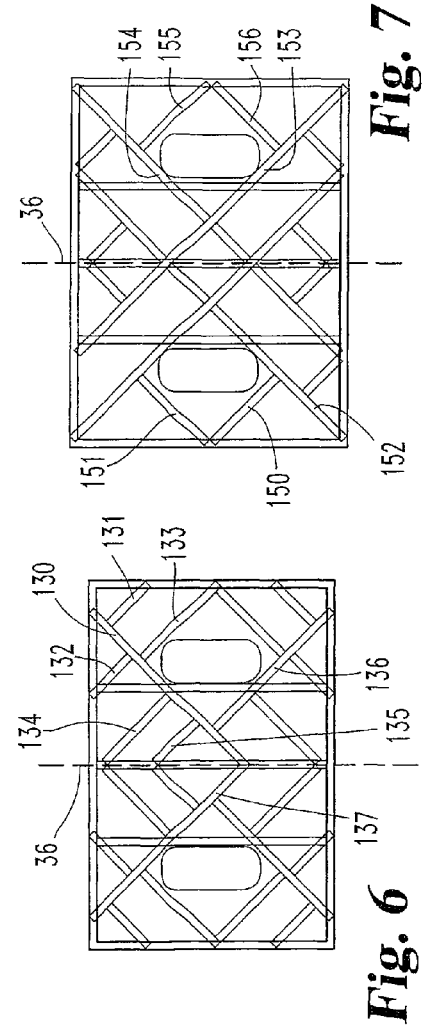

VEHICLE AND METHOD FOR WORKING TOP DRESSING MATERIAL INTO GRASS BLADES

BACKGROUND OF THE INVENTION

1. Field of the Invention

The present invention relates generally to the field of earth working devices and methods and more particularly those related to brushing or grooming grass.

2. Description of the Prior Art

Golf greens are maintained by applying a level of sand periodically atop the grass with a brush then being used to work the sand down between the blades of grass. The prior art includes a wheeled frame having a number of brushes depending therefrom with the frame then being towed by a vehicle back and forth across the green. The brushes are also used to groom fairway grass. One example of a grass brush vehicle is disclosed in U.S. Pat. No. 5,833,013.

The grass blades on a golf green are relatively close together with the result that it is sometimes difficult to work the sand down from the top of each blade towards the roots, particularly depending upon the humidity, moisture and other factors. Therefore, a brush vehicle is moved across the green in multiple passes. The additional labor time adds to the increased cost of maintenance. Disclosed herein is a grass brush vehicle and method which move the grass blades in different directions even though the brush vehicle makes a single pass over the golf green.

Brushes pulled across the ground have a normal tendency to provide a turning moment to the vehicle holding the brushes. Controlling the number of brushes on either side of the axis of vehicle movement greatly helps reducing the turning moment. Nevertheless, forces normally will exist causing the vehicle to veer off a straight line. The brush vehicle disclosed herein has a line of symmetry along the axis of movement by arranging the pattern of brushes on one side of the axis of movement being a mirror image of the pattern of brushes on the opposite side of the axis. Less force is required to pull the brush vehicle to move the brush vehicle while also ensuring the vehicle moves along a straight line.

A number of U.S. patents have issued relating to various brushes and other mechanisms for collection or movement of material. For example, the U.S. Pat. No. 5,918,684 discloses a plurality of brushes for collecting debris from a surface. U.S. Pat. No. 5,535,831 discloses a sand distributor and spreader for filling sand into aerated holes in golf greens. U.S. Pat. No. 5,477,927 discloses a turf maintenance and brushing machine particularly used with golf courses. U.S. Pat. No. 4,989,676 discloses a sweeper system for lawn mowing whereas U.S. Pat. No. 6,655,469 discloses a turf comber having a pattern of brushes for sweeping the turf. U.S. Pat. No. 5,018,857 discloses a brush attachment for grooming golf courses, athletic fields and alike. British Patent No. 2258147 discloses a ground effect brush wherein the brushes are divided into separate lengths that are mounted on a frame and arranged at an acute angle with respect to the intended direction of travel.

SUMMARY OF THE INVENTION

One embodiment of the present invention is the method of working sand down between grass blades on a golf green and including the step of providing a plurality of brushes extending downward on a frame of a vehicle. The frame has a front end and a rear end and a longitudinal axis extending from the rear end to the front end and further has wheels between the front end and the rear end. Brushes are arranged in patterns of at least four brushes per pattern. The method further includes arranging the brushes in the patterns so that the grass blades beneath each pattern are contacted by the brushes in sequential order one brush at time; distributing sand atop a golf green; moving the vehicle across the golf green along the longitudinal axis; contacting the grass blades with the brushes while the vehicle is moving across the golf green along the longitudinal axis; brushing the grass blades back and forth beneath a pattern while the vehicle is moving across the golf green along the longitudinal axis so that the blades are contacted and pushed at a first angle relative to the longitudinal axis and then contacted and pushed at a second angle relative to the longitudinal axis different from the first angle, then contacted and pushed at a third angle relative to the longitudinal axis different from the second angle, and then brushed at a fourth angle relative to the longitudinal axis different from the third angle so that the sand is worked downwardly between the blades.

Another embodiment of the present invention is a brush vehicle for working top dressing material into the grass blades of a golf green comprising a main frame having a front end and a rear end with a longitudinal axis of movement extending from the front end to the rear end. The frame has wheels for moving the frame across a golf green along the longitudinal axis of movement. A plurality of brushes are mounted to the frame and includes bristles extending downward to work top dressing material between the grass blades of the golf green as the frame is moved across the golf green. The brushes are arranged in a first pattern extending on opposite sides of the longitudinal axis of movement which is an axis of symmetry of the first pattern with half of the brushes located on one side of said longitudinal axis of movement being arranged as a mirror image of the remaining half of brushes located on a side of the longitudinal axis of movement opposite of the one side. The first pattern of brushes on the frame has a length along the longitudinal axis of movement positioning the brushes to contact each grass blade beneath the first pattern by at least four separate brushes as the frame passes completely over and past each grass blade.

BRIEF DESCRIPTION OF THE DRAWINGS

FIG. 4 is a top plan view of the first alternate embodiment of the brush pattern.

FIG. 5 is a top plan view of the second alternate embodiment of the brush pattern.

FIG. 6 is a top plan view of the third alternate embodiment of the brush pattern.

FIG. 7 a top plan view of the fourth alternate embodiment of the brush pattern.

DESCRIPTION OF THE PREFERRED EMBODIMENTS

Figure 1:
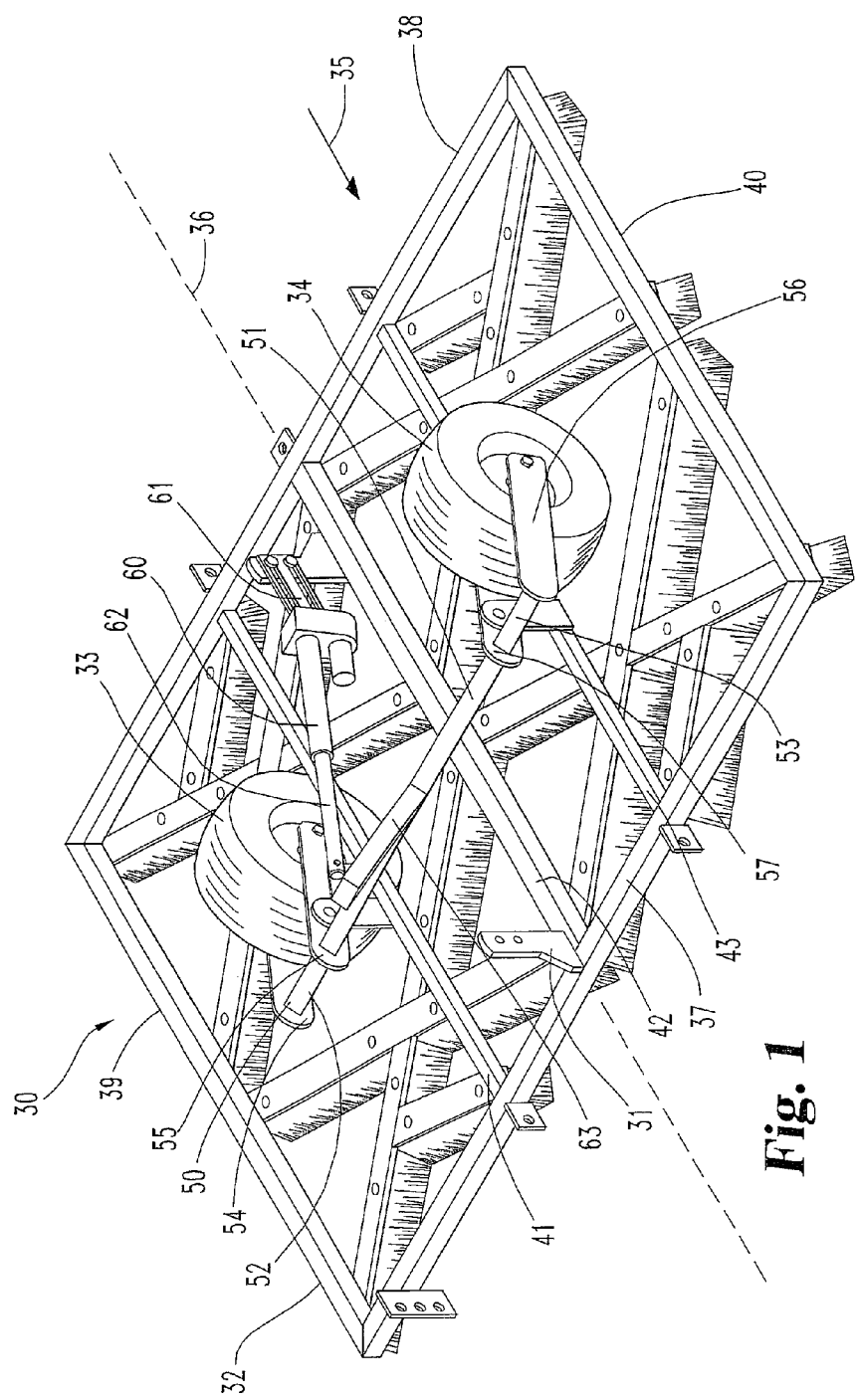
FIG. 1 is the perspective front view of the preferred embodiment of a grass brush vehicle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a brush vehicle 30 to be removably attached to and towed by a conventional powered vehicle. The powered vehicle may be a gasoline powered or battery operated cart or tractor and includes a rearwardly extending tow bar removably connectable to upright member 31 fixedly attached to a rectangular frame 32 of the brush vehicle. The brush vehicle includes a pair of wheels 33 and 34 rotatably mounted to the brush vehicle frame 32. The wheels are designed to extend downwardly contacting the ground thereby elevating the brushes apart from the ground. The wheels may be pivoted upward so that the brushes rest atop the ground. The powered vehicle is operable to pull the brush vehicle 30 across a golf green, fairway or other supporting surface in the direction of arrow 35 along the axis of movement 36.

Brush vehicle frame 32 includes a front member 37 and rear member 38 fixedly attached to side members 39 and 40 forming the rectangular frame. Three parallel members 41, 42 and 43 also are parallel to the side members 39 and 40 and have their front ends fixedly attached to front member 37 while the rear ends of the three members are fixedly attached to the rear member 38. Members 41-43 provide rigidity and strength to the rectangular frame. Center member 42 extends along the axis of movement 36 and bisects the rectangular frame. Member 41 is positioned between member 42 and side member 39, whereas member 43 is positioned between member 42 and side member 40.

Wheels 33 and 34 are rotatably mounted to a wheel frame 50, in turn, pivotally mounted to brush vehicle frame 32. Wheel frame 50 has a rod shaped member 51 with opposite end portions 52 and 53. A pair of parallel brackets 54 and 55 has first ends fixedly attached to end portion 52 of rod shaped member 51 and opposite ends to which wheel 33 is rotatably mounted. Likewise, a pair of parallel members 56 and 57 has ends fixedly attached to end portion 53 of rod shaped member 51 and opposite ends to which wheel 34 is rotatably mounted. An actuator 60 has a proximal end movably mounted to bracket 61 fixedly attached to frame 32. The actuator 60 has an extendable rod 62 with a distal end attached to an upwardly extending arm 63 having a bottom end fixedly attached to the rod shaped member 51. Actuator 60 may be a standard pneumatic or hydraulic cylinder motor or any other number of conventional devices including a worm gear device. The actuator is positioned so that when rod 62 extends, the wheels are caused to pivot upwardly thereby allowing the brushes to contact the ground for the grooming operation. Further, retraction of rod 62 causes the wheels to pivot downward thereby separating the brushes apart from the ground and allowing the brush vehicle to be transported across ground without the brushes being in contact with the ground.

Figure 3:
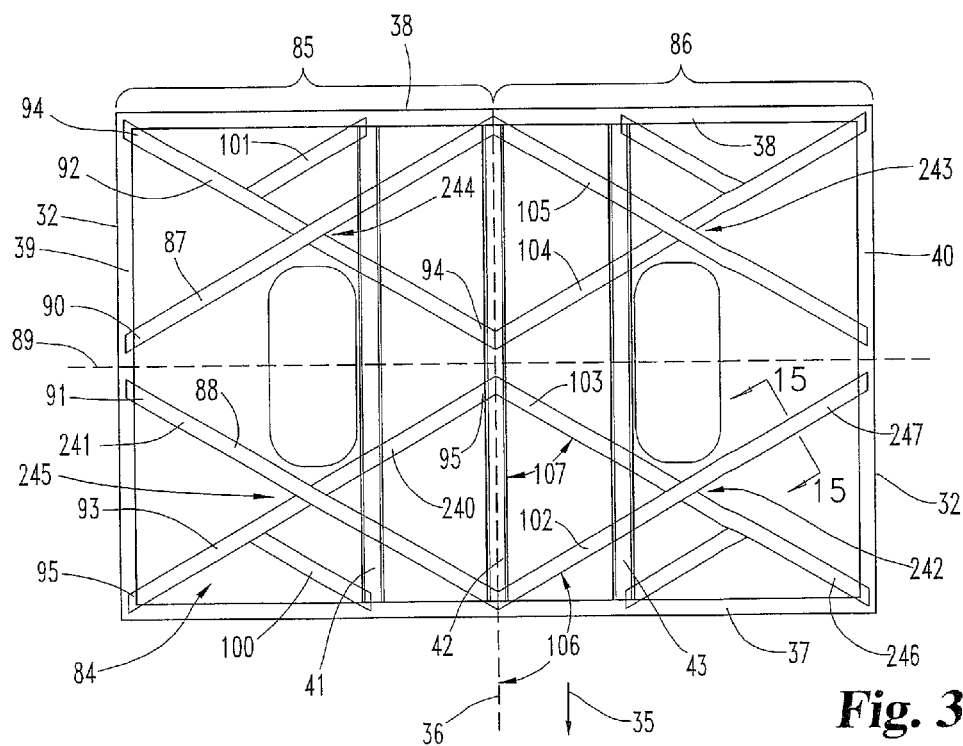
FIG. 3 is an enlarged top view of the preferred embodiment of the brush pattern utilized with the vehicle of FIG. 1.
Figure 8:
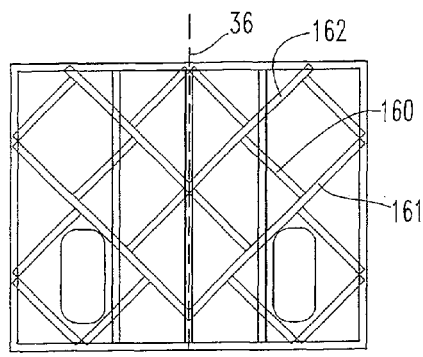
FIG. 8 a top plan view of the fifth alternate embodiment of the brush pattern.

FIGS. 3-14 illustrate the various brush patterns for arranging the brushes to extend downwardly from the rectangular frame 32. FIG. 3 illustrates the preferred embodiment of the brush pattern and is in accordance with the brush pattern shown in the perspective view of the brush vehicle in FIG. 1. FIGS. 4-14 show alternate embodiments of the brush pattern.

All of the brush patterns disclosed herein includes the essential requirement that each grass blade is pushed back and forth by at least four brushes. Further, the axis of movement 36 is a longitudinal axis of movement for the brush vehicle and provides an axis of symmetry wherein half of the brush pattern on one side of the axis is a mirror image of the remaining half of the brush pattern on the opposite side of the axis. That is by mirror image is meant that if the brush pattern is divided into a left segment 85 (FIG. 3) and a right segment 86 along axis 36 and then if one segment is pivoted over on its edge adjacent axis 36 and on top of the remaining segment, then the patterns of the two segments are identical.

Figure 2:
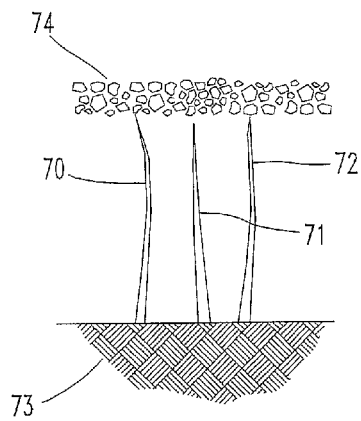
FIG. 2 is a fragmentary cross sectional view illustrating top dressing material atop grass blades extending outwardly from the ground.

FIG. 2 illustrates a few grass blades extending upwardly from the ground. Three blades 70-72 are shown extending upwardly from ground 73 which may be golf green, fairway or other supporting surface. Top dressing material 74 is positioned atop the distal ends of the grass blades with the brush vehicle pushing the blades in one direction relative to the axis of movement 36 and then pushing the grass blades in another direction relative to the same axis in a back and forth motion thereby causing the top dressing material to fall downwardly between adjacent blades. The blades in many cases are tightly positioned together thereby limiting the passage of top dressing material downwardly between blades. By utilizing the brush vehicle disclosed herein and the method of moving the blades, the top dressing material is forced down between the adjacent blades thereby reducing or eliminating the need for moving across the supporting surface repeatedly in order to ensure the top dressing material extends down between blades. A typical top dressing material is sand which is spread atop the golf green, fairway or other supporting surfaces. The golf green is essentially unplayable if the sand remains atop the grass blades and thus it is imperative that the sand be forced downwardly between blades so that a golf ball is supported only by the blades and not by sand. In many occasions, it is necessary to manually brush and rake the sand across the golf green thereby adding to the time and expense of readying the golf green for play. Such can be accomplished with a single pass across the golf green utilizing the brush vehicle and method disclosed herein.

Figure 15:
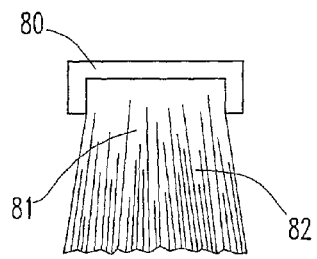
FIG. 15 is an enlarged cross-sectional view taken along the line and viewed in the direction of arrows 15-15 of FIG. 3.

FIG. 3 is an enlarged top plan view of the preferred embodiment of the brush vehicle of FIG. 1 with the wheels and actuator removed from the view to more clearly illustrate the arrangement of the brushes. In the preferred embodiment, the rectangular frame 32 (FIG. 3) includes an overall length of 48 inches along the axis of movement 36. The width of the rectangular frame in the embodiment of FIG. 3 extending from side member 39 to side member 40 is 72 inches. The brushes are held by brush holders, in turn, affixed to the bottom of rectangular frame 32. For example, a cross sectional view of brush holder 80 and brush 81 is shown in the cross sectional view taken along a line and viewed in the direction of arrow 15-15 of FIG. 3. The brush holder may take any shape or configuration in order to hold the brush that extends downward. For example, in FIG. 15, brush holder 80 has a downwardly opening C-shape cross section with the top end of brush 81 removably affixed thereto. Brush 81 includes a plurality of downwardly extending bristles 82 to engage the top dressing material resting atop the golf green, fairway other supporting surface. Brush holder 80 is then affixed to and beneath rectangular frame 32.

The brushes for each one of the embodiments disclosed herein are arranged in a pattern extending on opposite sides of the longitudinal axis of movement 36 which is also axis of symmetry. With half of the brushes located on one side of the longitudinal axis 36 being arranged as a mirror image of the remaining half of the brushes located on the side of a longitudinal axis of movement opposite the one side. Thus, pattern 84 consist of a first pattern 85 located to the left of axis 36 as viewed in FIG. 3 and pattern 86 which is located to the right of axis 36 as viewed in FIG. 3. Pattern 85 includes a first brush holder 87 extending from side member 39 to axis 36 where it is affixed at the junction of rear member 38 and member 42. A second brush holder 88 has its opposite ends affixed to side member 39 and member 42. The outer ends 90 and 91 of holders 87 and 88 are joined at the widthwise middle axis 89 which is arranged perpendicular to the longitudinal axis 36. Further, a pair of brush holders 92 and 93 have outer ends 94 and 95 joined respectively to the adjacent ends of rear member 38 and side member 39 and the adjacent ends of front member 37 and side member 39. The inner ends 94 and 95 of holders 92 and 93 are joined to the middle strengthening member 42 on opposite sides of axis 89. Last, a short leading brush holder 100 and a short trailing brush holder 101 have outer ends attached respectively to front member 37 and rear member 38 with the opposite inner ends of brush holders 100 and 101 attached respectively to brush holders 93 and 92.

Pattern 84 is designed so that each blade of grass located beneath pattern 84 is contacted by at least four separate brushes as rectangular frame 32 passes completely over and pass each grass blade located there beneath. For example, as brush vehicle 30 moves in the direction of arrow 35 (FIG. 1) along the axis of movement 36, a blade of grass will first pass beneath front member 37 and then be pushed and moved at least four separate times by brushes before the blade passes past rear member 38 and apart from pattern 84. As an example, as a blade of grass passes beneath member 37, with continued movement of frame 32 in the direction of arrow 35, the blade will be pushed and moved in sequential fashion as the blade passes beneath the brushes held by holders 102, 103, 104 and 105. The brush extending downwardly from holder 102 will push the grass blade away from axis 36 since the brush and holder extends rearwardly from the front end member 37 toward the rear end member 38. Brush holder 102 and its associated brush are arranged at an angle 106 relative to axis 36 which is greater than 90 degrees but less than 180 degrees. As the grass blade is contacted by the brush depending or extending downwardly from holder 103, the same grass blade will be pushed back toward axis 36 since the brush extending downwardly from holder 103 is arranged at an approximate angle 107 of less than 90 degrees but more than 0 degrees. The grass blade is therefore pushed in one direction and then in a generally opposite direction giving a back and forth motion to the blades allowing the sand located atop the distal ends of the grass blades to move towards the grass blade roots. Similarly, the holder 104 is arranged at an angle relative to axis 36, the same as angle 106, whereas holder 105 is arranged at an angle relative to axis 36, the same as angle 107. Thus as the grass blade passes from the brush extending downward from holder 103 and is contacted by the brush extending downwardly from holder 104, the grass blade is pushed in a direction away from axis 36. Similarly, when the grass blade passes from beneath the brush extending downward from holder 104 and is contacted and pushed by the brush extending downwardly from holder 105, the grass blade is pushed toward axis 36 thereby repeating the back and forth motion.

Figure 9:
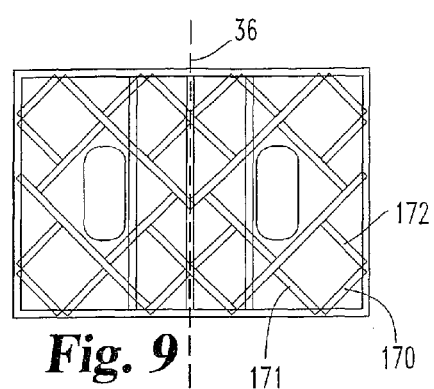
FIG. 9 is a top plan view of the sixth alternate embodiment of the brush pattern.
Figure 10:
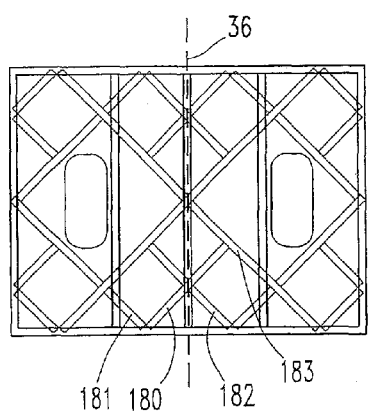
FIG. 10 is a top plan view of the seventh alternate embodiment of the brush pattern.
Figure 11:
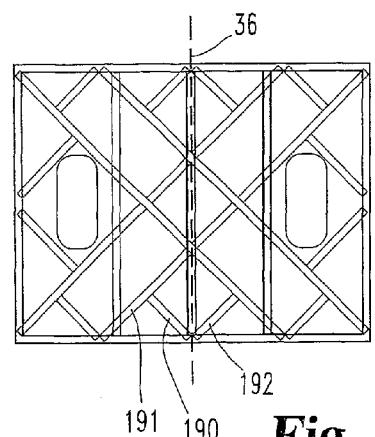
FIG. 11 is a top plan view of the eighth alternate embodiment of the brush pattern.
Figure 12:
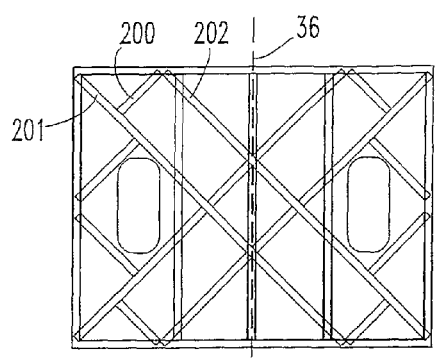
FIG. 12 is a top plan view of the ninth alternate embodiment of the brush pattern.
Figure 13:
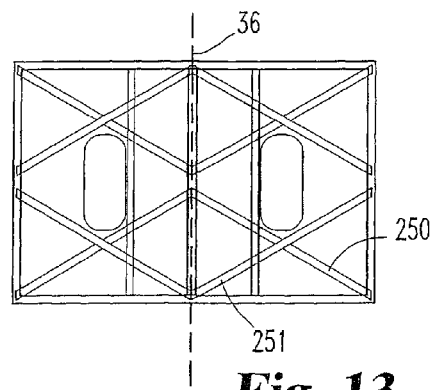
FIG. 13 is a top plan view of the tenth alternate embodiment of the brush pattern.
Figure 14:
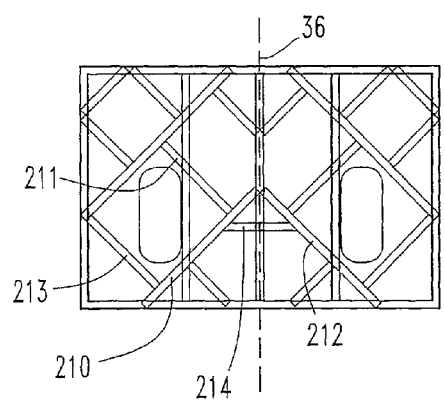
FIG. 14 is a top plan view of the eleventh alternate embodiment of the brush pattern.

The brush patterns illustrated in FIGS. 3-15 are identical with respect to the brush pattern located on one side of the longitudinal axis of movement being a mirror image of the brush pattern located on the opposite side of the longitudinal axis of movement. Further similarities exist. For example, all of the brushes in the patterns illustrated in FIGS. 6-12 are arranged perpendicular relative to the adjacent brush in which they are in contact. In FIG. 6, the brush 130 extending downwardly from the holder is arranged perpendicularly relative to the brushes extending downwardly from holders 131-137. In FIG. 7, brush 150 is perpendicularly arranged with respect to brushes 151 and 152, whereas in FIG. 8, brush 160 is perpendicularly arranged with respect to brushes 161 and 162. In FIG. 9, brush 170 is perpendicularly arranged with respect to brushes 171 and 172, whereas in FIG. 10, brush 180 is perpendicularly arranged with respect to brushes 181, 182 and 183. Brush 190 (FIG. 11) is perpendicularly arranged with respect to brushes 191 and 192, whereas in FIG. 12, brush 200 is perpendicularly arranged with respect to brush 201 and brush 202. The patterns shown in FIGS. 4, 5 and 14 include brushes that are generally perpendicularly with respect to adjacent brushes that they are in contact with although additional brushes are included that are not perpendicular to the adjacent brush. For example, brush 210 in the FIG. 14 pattern is arranged perpendicularly with respect to brushes 211-213 but acutely arranged with respect to brush 214. Similarly, in the FIG. 4 pattern, brush 220 is perpendicularly arranged with respect to brushes 221-223 but acutely arranged with respect to brushes 224 and 225. Brush 230 in FIG. 5, is perpendicularly arranged with respect to end 232 of brush 231 and the ends of brushes 233-234 and acutely arranged with respect to brushes 235 and 236. The brush patterns illustrated in FIGS. 3 and 13 are unique with respect to the other brush patterns disclosed herein in that brushes in contact with each other are obliquely arranged with respect to each other. Thus, in FIG. 3, brushes 240 and 241 are obliquely arranged with respect to each other and brushes 250 and 251 in FIG. 13 are obliquely arranged with respect to each other. The brush patterns of FIGS. 3-14 each have a width of 72 inches.

The patterns shown in FIGS. 4-12, 14 each include at least one square brush pattern on each side of the longitudinal axis as a result of the brushes being perpendicular with respect to each other. For example, a square pattern of brushes is formed on the right side axis of longitudinal movement in FIG. 7 with the square brush pattern being composed of brushes 153-156. Since the right side of the brush pattern as viewed in FIG. 7 is a mirror image of that pattern to the left side of the axis of movement, a similar square brush pattern is located on the opposite side of the axis.

The brush patterns shown in FIGS. 3 and 13 are distinguishable from the other brush patterns disclosed herein in that at least two brush configurations forming an X are located on each side of the longitudinal axis of movement. For example, brushes 246 and 247 (FIG. 3) form a single X brush pattern 242 and the same is repeated by two separate brushes forming X configured brush pattern 243, both of which are located on the right side of the longitudinal axis of movement 36. Similarly, X configurations are formed by X configurations 244 and 245 formed by intersecting brushes located on the left side of the longitudinal axis of movement. The same type of X configurations are included in the brush patterns of FIG. 13.

The method of working the sand down between the grass blades on the golf green includes providing a plurality of brushes that extend downwardly on a frame of a movable vehicle. The longitudinal axis of the vehicle extends from the rear end of the frame to the front end and forms an axis of movement for the vehicle. A pair of wheels are located between the front end and rear end. Next, the brushes are positioned in patterns to have at least four separate brushes arranged in a pattern in order that each grass blade that passes beneath the brushes is contacted and pushed at least four times in opposite directions. The brushes are placed in sequential order so that each grass blade is contacted by a separate brush at a time. The method includes distributing the top dressing material, such as sand, atop the golf green with the sand resting atop the distal ends of the grass blades. The vehicle is then moved across the golf green along its longitudinal axis of movement. The grass blades are contacted with the brushes while the vehicle is moving across the golf green along the axis. The brushes contact the grass blades brushing the blades back and forth beneath the pattern of brushes. First, the blades within a four brush pattern are contacted and pushed at a first angle relative to the longitudinal axis of movement and then contacted and pushed at a second angle relative to the longitudinal axis which is different from the first angle. Third, the blades are contacted again and pushed at a third angle relative to the longitudinal axis which is different from the second angle and then the brushes contact the blades at a fourth angle relative to the longitudinal axis different from the third angle so that the sand is eventually worked down between the blades. Whereas, the first angle and third angle are equal, the second and fourth angles are equal during the brushing step. In one embodiment of the method, the first, second, third and fourth angle are oblique relative to the longitudinal axis. The notable exception in practicing the method is that in the brush patterns of FIGS. 4 and 5, there are small brushes at the front end of the brush pattern that are arranged perpendicularly with respect to the longitudinal axis of the movement. In the case of FIG. 4, brushes 224 and 225, and in the FIG. 5 pattern, the brushes 235 and 236 are arranged perpendicularly to the longitudinal axis of the movement. Prior to moving the grass brush vehicle across the golf green, the wheels are pivoted upwardly so that the brushes will rest atop the grass blades. Most importantly, the method includes arranging the brushes on one side of the longitudinal axis of movement which is an axis of symmetry to be a mirror image of the brushes on the side of the longitudinal axis opposite the one side.

The method so described allows the step of contacting each grass blade beneath the pattern with at least four separate brushes in a single pass of the vehicle. The top dressing works downwardly between the grass blades by moving the vehicle across the blades while maintaining contact between the blades and brushes. As the top dressing is worked downwardly, each grass blade is contacted beneath the pattern of brushes with brushes arranged in a pattern so that the pattern has in sequential order at least four brushes whereby each brush in the pattern extends at a different angle relative to the longitudinal axis of the movement different from an adjacent brush within the same pattern thereby pushing the grass blade back and forth so that the top dressing material or sand is eventually worked downwardly between the blades.

While the invention has been illustrated and described in detail in the drawings and foregoing description, the same is to be considered as illustrative and not restrictive in character, it being understood that only selected embodiments have been shown and described and that all changes and modifications that come within the spirit of the invention are desired to be protected.

What is claimed is:

1. The method of working sand down between grass blades on a golf green comprising the steps of:
   providing a plurality of brushes having bristles extending downward on a frame of a vehicle, said frame having a front end and a rear end and a longitudinal axis extending from said rear end to said front end and further having wheels between said front end and said rear end;
   positioning said plurality of brushes in a pattern having at least four brushes in said pattern with said longitudinal axis separating said pattern into a first side and an opposite second side:
   arranging brushes on said first side of said longitudinal axis which is an axis of symmetry to be a mirror image of brushes on said opposite second side of said longitudinal axis opposite of said first side and arranged so that said brushes contact all blades beneath said frame;
   orienting the brushes in the pattern so that the grass blades beneath said pattern on said first side and on said opposite second side are contacted by at least four brushes in sequential order one brush at time;
   distributing sand atop a golf green;
   moving the vehicle across the golf green in a single pass along said longitudinal axis;
   contacting each of the grass blades beneath said frame with at least four of the brushes while the vehicle is moving across the golf green in a single pass along said longitudinal axis; and,
   brushing each of the grass blades in said pattern back and forth at least four separate times while the vehicle is moving across the golf green along said longitudinal axis so that each of the blades on said first side and said opposite second side are:
      contacted and pushed at a first angle by a brush of said plurality of brushes relative to said longitudinal axis and then,
      contacted and pushed at a second angle by a brush of said plurality of brushes relative to said longitudinal axis different from said first angle and then,
      contacted and pushed at a third angle by a brush of said plurality of brushes relative to said longitudinal axis different from said second angle and then, and,
      brushed at a fourth angle by a brush of said plurality of brushes relative to said longitudinal axis different from said third angle so that the sand is worked downwardly between the blades; and wherein:
   said blades that are contacted and pushed at said first angle, said second angle, said third angle and said fourth angle are the same blades.

2. The method of claim 1 wherein:
   said first angle and said third angle are equal and said second angle and said fourth angle are equal during said brushing step.

3. The method of claim 1 wherein:
   said first angle, second angle, third angle, and fourth angle are oblique relative to said longitudinal axis.

4. The method of claim 1 wherein:
   all of said brushes are arranged obliquely relative to said longitudinal axis.

5. The method claim 4 wherein:
   pivoting said wheels upwardly so said brushes will rest atop said grass blades.

6. A brush vehicle for working top dressing material into the grass blades of a golf green comprising:

a frame having a front end and a rear end with a longitudinal axis of movement extending from said front end to said rear end, said frame having a front member located at said front end, a rear member located at said rear end, and a first side member and a second side member spaced apart and extending from said front member to said rear member providing a rectangular configuration for said frame, said frame having a longitudinal axis of movement extending from said front member to said rear member, said frame having a first wheel located on a first side of said axis and a second wheel located on a second side of said axis opposite said first side of said axis for moving said frame across a golf green along said longitudinal axis of movement;

a plurality of brushes mounted to said frame and including bristles extending downward to work top dressing material between the grass blades of the golf green as said frame is moved across the golf green, and wherein:

said brushes are arranged in a pattern with said axis dividing said pattern into a first segment of brushes having said first wheel rotatably mounted therein and a second segment of bushes having said second wheel rotatably mounted therein with said first segment and said second segment located on opposite sides of said longitudinal axis of movement which is an axis of symmetry of said pattern with half of the brushes located on a first side of said longitudinal axis of movement being arranged as a mirror image of the remaining half of brushes located on a second side of said longitudinal axis of movement opposite of said first side, and, said pattern of brushes on said frame has a length along said longitudinal axis of movement positioning said brushes to contact each grass blade beneath said pattern by at least four separate brushes as said frame passes completely over and past each grass blade so each blade of grass located beneath said frame is contacted by at least four brushes of said plurality of brushes which push each blade in sequential manner in a first direction, a second direction, a third direction and a fourth direction with each brush within said pattern arranged at an angle to said axis of movement different from an adjacent brush within said pattern as said frame is moved across each blade working the top dressing material between blades.

7. The brush vehicle of claim 6 wherein:

each brush in said pattern is located perpendicularly with respect to an adjacent brush in said pattern.

8. The brush vehicle of claim 6 wherein said frame includes:

a structure having said first wheel and said second wheel rotatably mounted thereon with said structure pivotally mounted to said frame; and further comprising:

an actuator mounted on said frame and connected to structure to raise and lower said structure and said first wheel and said second wheel.

9. The brush vehicle of claim 8 wherein:

said actuator has a rod, said structure has a first end portion and a second end portion having said first wheel and said second wheel respectively rotatably mounted thereto, said actuator operable to extend and retract said rod to pivot said first wheel and said second wheel to and from said golf green.

10. The brush vehicle of claim 6 wherein:

some of said brushes in said pattern are arranged obliquely relative to some of said brushes in said pattern.

11. The brush vehicle of claim 6 wherein:

some of said brushes in said pattern form an X configuration with two X configurations located on said first side of said longitudinal axis of movement and two X configurations located on said second side of said longitudinal axis of movement opposite said first side.

12. A brush vehicle for working top dressing material into the grass blades of a golf green comprising:

a frame having a front end and a rear end with a longitudinal axis of movement extending from said front end to said rear end, said frame having a front member located at said front end, a rear member located at said rear end, and a first side member and a second side member spaced apart and extending from said front member to said rear member providing a rectangular configuration for said frame, said frame having a longitudinal axis of movement extending from said front member to said rear member, said frame further having a first wheel located on one side of said axis and a second wheel located on an opposite side of said axis for moving said frame across a golf green along said longitudinal axis of movement;

a plurality of brushes mounted to said frame and including bristles extending downward to work top dressing material between the grass blades of the golf green as said frame is moved across the golf green, and wherein:

said brushes are arranged in a pattern with said axis dividing said pattern into a first segment of brushes having said first wheel rotatably mounted therein and a second segment of brushes having said second wheel rotatably mounted therein with said first segment and said second segment located on opposite sides of said longitudinal axis of movement which is also an axis of symmetry of said pattern with half of the brushes located on one side of said longitudinal axis of movement being arranged as a mirror image of the remaining half of brushes located on a side of said longitudinal axis of movement opposite of said one side, and, said pattern of brushes on said frame has a length along said longitudinal axis of movement positioning said brushes to contact each grass blade beneath said pattern by at least four separate brushes as said frame passes completely over and past each grass blade so each blade of grass located beneath said frame is contacted by at least four brushes of said plurality of brushes which push each blade in sequential manner in a first direction, a second direction opposite said first direction, a third direction opposite said second direction and a fourth direction opposite said third direction.

13. A brush vehicle for working top dressing material into the grass blades of a golf green comprising:

a frame having a front end and a rear end with a longitudinal axis of movement extending from said front end to said rear end, said frame having a longitudinal axis of movement extending from said front end to said rear end, said frame further having a first wheel located on one side of said axis and a second wheel located on an opposite side of said axis for moving said frame across a golf green along said longitudinal axis of movement;

a plurality of brushes mounted to said frame and including bristles extending downward to work top dressing material between the grass blades of the golf green as said frame is moved across the golf green, and wherein:

said brushes are arranged in a pattern with said axis dividing said pattern into a first segment of brushes and a second segment of brushes with said first segment and said second segment located on opposite sides of said longitudinal axis of movement which is also an axis of symmetry of said pattern with half of the brushes located on one side of said longitudinal axis of movement being arranged as a mirror image of the remaining half of brushes located on a side of said longitudinal axis of movement opposite of said one side, and, said pattern of brushes on said frame has a length along said longitudinal axis of movement positioning said brushes to contact each grass blade beneath said pattern by at least four separate brushes as said frame passes completely over and past each grass blade so each blade of grass located beneath said frame is contacted by at least four brushes of said plurality of brushes which push each blade in sequential manner in a first direction, a second direction opposite said first direction, a third direction opposite said second direction and a fourth direction opposite said third direction.

* * * * *